United States Patent
Dandekar et al.

(10) Patent No.: US 7,996,778 B2
(45) Date of Patent: Aug. 9, 2011

(54) CENTRAL INTERNET BROWSER CONTROL FOR MULTIPLE BROWSERS ENABLED SYSTEM

(75) Inventors: Shree A. Dandekar, Round Rock, TX (US); Susan Anderson, Jonestown, TX (US); James A. Howell, Jr., Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 505 days.

(21) Appl. No.: 11/436,455

(22) Filed: May 18, 2006

(65) Prior Publication Data
US 2007/0271505 A1   Nov. 22, 2007

(51) Int. Cl.
*G06F 3/00* (2006.01)
(52) U.S. Cl. .......... 715/760; 715/744; 705/332; 705/26; 709/203
(58) Field of Classification Search .................. 715/760, 715/744; 705/26, 332; 709/203
See application file for complete search history.

(56) References Cited

U.S. PATENT DOCUMENTS

| | | | | |
|---|---|---|---|---|
| 5,737,560 | A * | 4/1998 | Yohanan | 715/847 |
| 6,032,162 | A * | 2/2000 | Burke | 715/207 |
| 6,072,491 | A * | 6/2000 | Yohanan | 715/835 |
| 6,219,680 | B1 * | 4/2001 | Bernardo et al. | 715/234 |
| 6,353,448 | B1 * | 3/2002 | Scarborough et al. | 715/744 |
| 6,473,738 | B1 * | 10/2002 | Garrett | 705/26 |
| 6,963,901 | B1 * | 11/2005 | Bates et al. | 709/206 |
| 7,006,964 | B2 * | 2/2006 | Aaltonen et al. | 703/24 |
| 2002/0095522 | A1 * | 7/2002 | Hayko et al. | 709/311 |
| 2002/0198962 | A1 * | 12/2002 | Horn et al. | 709/218 |
| 2003/0225631 | A1 * | 12/2003 | Howell et al. | 705/27 |
| 2004/0015580 | A1 * | 1/2004 | Lu et al. | 709/224 |
| 2005/0080667 | A1 * | 4/2005 | Knott et al. | 705/14 |
| 2005/0198628 | A1 * | 9/2005 | Graham et al. | 717/174 |
| 2005/0203801 | A1 * | 9/2005 | Morgenstern et al. | 705/14 |
| 2005/0246444 | A1 * | 11/2005 | Koehane et al. | 709/227 |
| 2006/0224967 | A1 * | 10/2006 | Marmaros | 715/738 |
| 2007/0233880 | A1 * | 10/2007 | Nieh et al. | 709/227 |

OTHER PUBLICATIONS

Hardmeier, (published article: "Playing favorites: How to control which browser is 'Head honcho' on your PC"), published May 23, 2005, pp. 1-7.*
Patterson (published article, "How to . . . Set Your Default Browser"), published Jan. 2000, pp. 1-3.*
http://www.pc-tools.net/win32/setbrowser/; Jem Berkes, SysDesign "SetBrowser 1.4—Set Default Windows Web Browser" Mar. 11, 2005 (1 page).

* cited by examiner

*Primary Examiner* — Tuyetlien T Tran
(74) *Attorney, Agent, or Firm* — Hamilton & Terrile, LLP; Stephen A. Terrile

(57) ABSTRACT

An information handling system having multiple browser applications includes a browser management utility for selecting one of the browsers as a default browser. The browser management utility provides a central access point for accessing the multiple browsers. The browser management utility enables a user to port settings from one browser application to another browser application. The browser management utility also includes a configurable option which provides the guidance novice users while enabling more experienced users more control over the selection of browser and which information is ported from one browser to another. Additionally, such a system provides a user with a single location to store and manage common browser application settings such as bookmarks, passwords, and cookies.

2 Claims, 7 Drawing Sheets

CENTRAL INTERNET BROWSER CONTROL FOR MULTIPLE BROWSERS ENABLED SYSTEM

BACKGROUND OF THE INVENTION

1. Field of the Invention

The present invention relates to information handling systems and more particularly to central internet browser control for multiple browsers enabled system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue relevant to information handling systems relates to when an information handling system has multiple browser applications installed on it. This issue is particularly relevant when the ordered information handling system is a build to order computer system. During the configuration of the information handling system, one configuration option might be allowing a customer to select one or more different browser applications such as the Internet Explorer browser application, the Netscape browser application, the Opera browser application and the Mozilla browser application. A goal of information handling system manufacturers is to reduce overall customer support costs by enabling customers to support themselves and often providing multiple browser applications can cause customer confusion.

There are a number of issues that may be presented when offering a system with multiple browser applications. For example, it is desirable to enable a user to easily switch between the multiple preinstalled browser applications. Additionally, when multiple browsers are installed on a single computer system, there is no single access point to the internet to both invoke and configure internet browsers.

An additional issue relating to multiple browser applications can present itself if a user has a Pop-Up blocker application such as the Google Pop-Up blocker application. When the Pop-Up blocker application is associated to execute with a first browser application (e.g., the Internet Explorer browser application) there is no easy way to transfer the blocked list of websites from the first browser application to another browser application if the user wishes to use the other browser application.

An additional issue presents itself because information handling systems are provided to customers of a varying level of expertise. These customers can range for novices to veteran IT experts. A desired level of assistance and guidance can range anywhere from the novice looking for the supplier to guide and educate them each step of the way to the ultra expert looking for serious or highly important information in a timely manner. As users attempt to perform and manage increasingly complex tasks, the number of notifications to guide the novice user is growing rapidly. While the novice user appreciates this point-of-need guidance, the more experienced user may become frustrated. To eliminate this frustration, a more experienced user often configures each application individually to reduce or eliminate these notifications.

It is known to provide a method for setting a default browser from multiple browsers. For example, FIG. 1, labeled Prior Art, shows one such method. However, this method does not enable a user to port preferences such as cookies, bookmarks, passwords, pop-up blocker black list from one browser to the other Certain browser applications include an import module which enables users to switch from the Internet Explorer browser application to the new browser application. The Firefox browser application is an example of one such browser application which includes an input module. When a user attempts to install the Firefox browser application, the Firefox browser application attempts to transfer the Favorites, cookies, stored passwords and other settings from the Internet Explorer browser application to the Firefox browser application. With this application, if in the future the user wishes to transfer these settings again to Firefox, the user can access the import module via the File menu and then actuating an Import option.

It would be desirable to provide a central access point will simplify internet access for customers by disassociating the application to access the internet from the internet. Additionally, it would be desirable to provide this central access point as a configurable option which would provide the guidance to novice users while enabling more experienced users more control.

SUMMARY OF THE INVENTION

In accordance with the present invention, an information handling system having multiple browser applications includes a browser management utility for selecting one of the browsers as a default browser. The browser management utility provides a central access point for accessing the multiple browsers. The browser management utility enables a user to port settings from one browser application to another browser application. The browser management utility also includes a configurable option which provides the guidance novice users while enabling more experienced users more control over the selection of browser and which information is ported from one browser to another. Additionally, such a system provides a user with a single location to store and manage common browser application settings such as bookmarks, passwords, and cookies.

More specifically, the browser management utility of the present invention provides a methodology for changing Browser settings on a fly depending on the browser selected by the customer. The browser management utility resides within the information handling system and is invoked every time a customer tries to launch a browser.

The browser management utility uses a common format for storing the Browser data such as default browser data, bookmark data, search engine data and default portal information on the customers system. Each Browser partner stores data objects in the common format.

The browser management utility improves the customer experience when around sing multiple browsers on the same system. The browser management utility could also be provided as an after market utility that a user could install onto their system.

Accordingly, rather than customers needing to manage each version of the preinstalled browser or portal applications on their systems, the browser management utility provided by the system manufacturer provides a central process for managing the launching and configuration of the browser or portal applications. The browser management utility allows the user to select a default browser or portal when configuring the system. The manufacturer then factory installs and configures the selected default browser application. Then post sale, the user can manage their browser or portal via the manufacturer installed browser management utility.

The browser management utility resides on the customer information handling system. Every time a user switches between browsers, the user is prompted to regarding whether to port settings between browsers. The user is also provided with an option of disabling the browser management utility.

In one embodiment, the data objects such as default browser settings, bookmarks, search engine preference and default portal information are stored in an encrypted format on the information handling system. The client system includes a unique decryption algorithm to port the data from one browser to another.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An on-line store is one component of an Internet website to which a customer may go to configure a particular information handling system, for example, according to desired options of the customer. The on-line store is typically a subset of a larger Internet website. At the on-line store, a customer can select one or more products in which the customer is interested. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the on-line store application controls.

Figure 1:
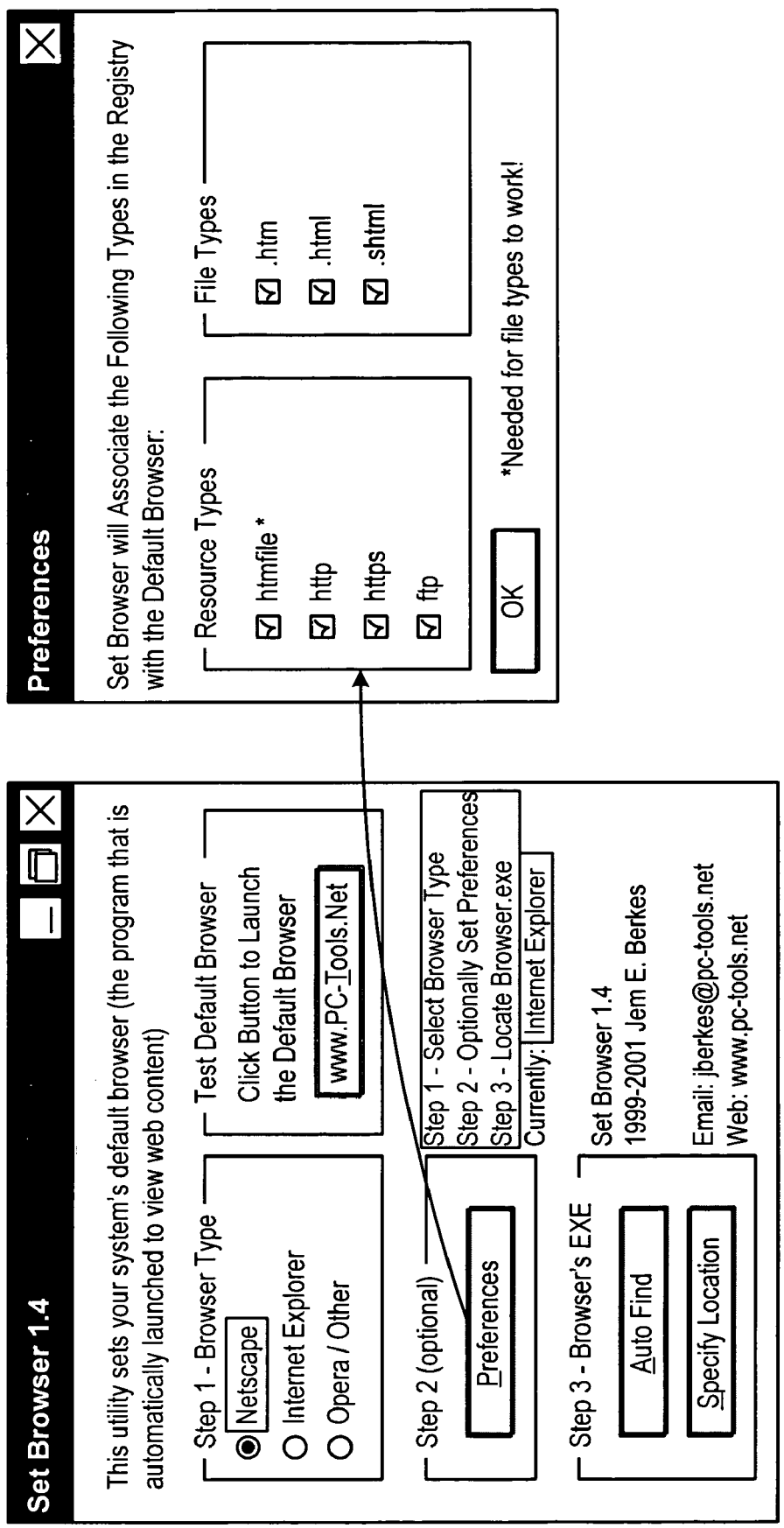
FIG. 1 shows an overview block diagram representation of an on-line store.
Figure 2:
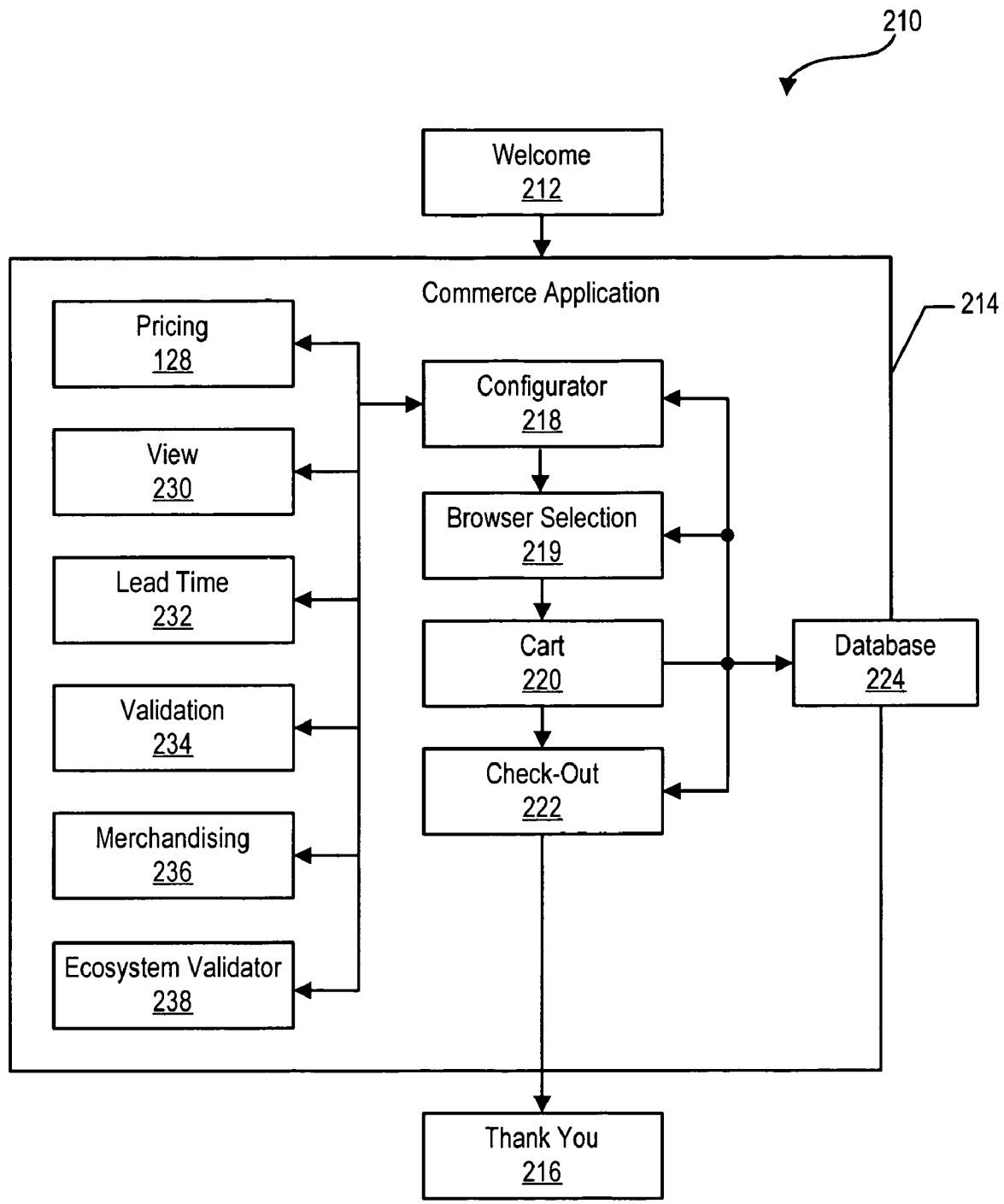
FIG. 2 shows a schematic diagram of a system for installing software.

Referring now to FIG. 2, an on-line store 210 for use in generating customer configured information handling systems, e.g., customer configured computer systems, is shown.

The on-line store 210 includes a welcome or introductory module 212, a commerce application module 214, and a thank you module 216. The on-line store 210 includes an on-line store user interface which enables the system configuration, pricing, and ordering of an information handling system via the Internet. The commerce application 214 includes a configurator 218, a browser selection module 219, a shopping cart 220, a checkout module 222 and database 224. The database 224 provides information to the configurator 218, shopping cart 220, and checkout module 222. The configurator 218 includes a pricing module 228, a view module 230, a lead time warning module 232, a validation (or compatibility) warning module 234, and a merchandising module 236. The various modules of the configurator 218 are driven by data from the database 224, and thus the configurator 218, browser selection module 219, shopping cart 220, and checkout module 222 are all linked to the database 224.

In operation of the on-line store 210, the welcome module 212 presents a welcome page 212, the configurator 118 presents a configurator page, the browser selection module 219 presents a browser selection page, the shopping cart 220 presents a shopping cart page, the checkout module 222 presents a checkout page, and the thank you module 216 presents a thank you page. The welcome page includes a static page and generally resides outside of the commerce application 214. The configurator page, browser selection page, shopping cart page, and checkout page are within the commerce application and use information provided by the database. The checkout includes a payment feature, delivery feature, personal verses business feature, and instructional text features (i.e., how to fill out an on-line form.)

The welcome page is typically an introductory page and includes a link into the on-line store 210. The welcome page is typically a static welcome page. Upon completion of configuration of a system, the customer is transferred to a checkout page. After completion of the checkout, the customer is transferred to a static thank you page 216. The thank you page 216 provides a message of gratitude to the customer for having placed the order or for visiting the on-line store.

Aspects of the configurator 218 which interact with database 224 are shown in FIG. 2. In essence, the entire commerce application 214 interacts with the database. The configurator 218, browser selection module 219, shopping cart 220, and checkout module 222 are each part of the commerce application 214 and interact with the database 224. For example, with the shopping cart 220, additional merchandising information associated with a particular system which has been configured and placed in the shopping cart by an on-line store customer can be provided.

Figure 3:
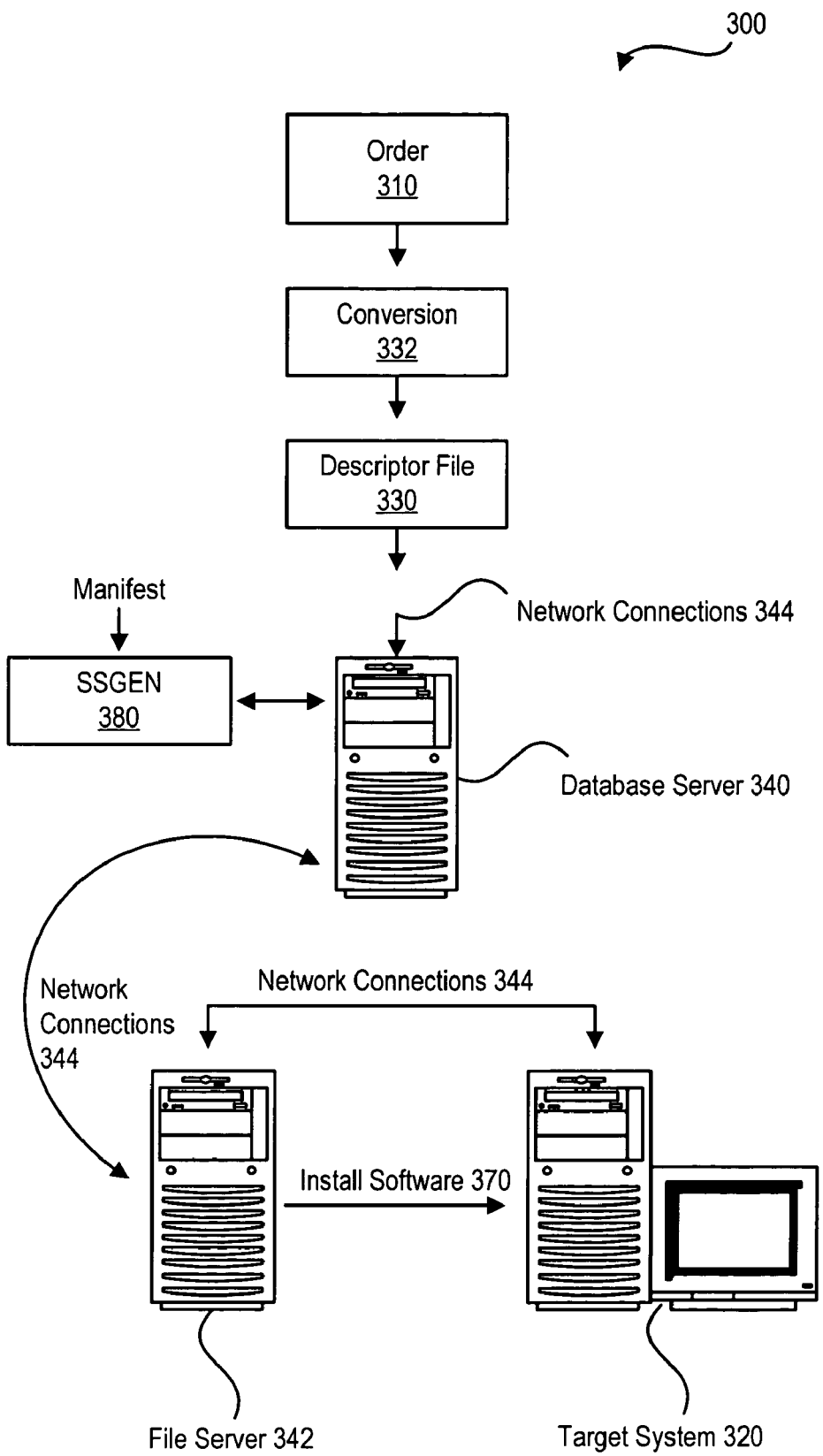

FIG. 3 is a schematic diagram of a software installation system 300 at an information handling system manufacturing site. In operation, an order 310 is placed to purchase a target information handling system 320, via, e.g., the on-line store. The target information handling system 320 to be manufactured contains a plurality of hardware and software components. For instance, target information handling system 320 might include a certain brand of hard drive, a particular type of monitor, a certain brand of processor, as well as particular software products and preordered services. The software may include a particular version of an operating system along with all appropriate driver software and other application software along with appropriate software bug fixes. Before target information handling system 320 is shipped to the customer, the plurality of components are installed and tested. Such software installation and testing advantageously ensures a reliable, working information handling system which is ready to operate when received by a customer.

The installation includes installing the browser management utility as well as one or more browser applications as indicated by the customer during the configuration of the information handling system and as desired by the manufacturer. The testing includes testing the browsers and browser management utility.

Because different families of information handling systems and different individual computer components may require different software installations, it is desirable to determine which software to install on a target information handling system 320. A descriptor file 330 is provided by converting an order 310, which corresponds to a desired information handling system having desired components, into a computer readable format via conversion module 332. The descriptor file 330 includes components component descriptors corresponding to components determined to be desirable based upon the configuration process.

Component descriptors are computer readable descriptions of the components of target information handling system 320 which components are defined by the order 310. In a preferred embodiment, the component descriptors are included in a descriptor file called a system descriptor record which is a computer readable file containing a listing of the components, both hardware and software, to be installed onto target information handling system 320. Having read the plurality of component descriptors, database server 340 provides an image having a plurality of software components corresponding to the component descriptors to file server 342 over network connection 344. Network connections 344 may be any network connection well-known in the art, such as a local area network, an intranet, or the internet. The information contained in database server 340 is often updated such that the database contains a new factory build environment. The software is then installed on the target information handling system 320 via file server 342. The software is installed on the target information handling system via the image. The image may include self-configuring code.

The database server 340 may also be updated via a software stack generator machine 380. The software stack generator (SSGEN) machine 380 is capable of downloading and installing a configurable set of software parts and then automatically capturing an image of the contents, optionally uploading the image to a shared server such as the database server 340 for later use. The software stack generator machine 380 is capable of being controlled by a centralized front end, thus allowing two or more software stack generator machines to be set up in an image building farm.

In operation, automating the generation of images provides the ability to download the parts to be installed into the image from a network or other storage device. The software stack generator machine 380 may include scriptable package delivery mechanisms. The software stack generator machine 380 may include or receive images which include an integrated rapid install system (IRIS). The integrated rapid install system may then be installed onto the target system when the image is installed onto the target system.

Images to be created are described using a manifest which is represented, e.g., as an XML document. The contents of the image include some or all of a base operating system, application programs (including one or more browser applications), applets (for hardware), etc. The manifest is provided to the software stack generator machine 342 and causes the image building process to begin. After the image is created, the image can be installed onto a target system 320 such that the building of the image is transparent to the target system. For example, the SSGEN machine 380 removes anything from the registry of the operating system that would indicate that the software stack was created by the SSGEN machine 380.

The components also include the browser management utility. The browser management utility tailors a support experience based upon decisions that are made by the user during configuration of the ordered information handling system such as whether a particular browser was indicated by the user. For example, if a user selects a particular browser during the configuration of the information handling system, then the browser management utility is configured such that the selected browser becomes the default browser for the user when the information handling system is first activated.

Figure 4:
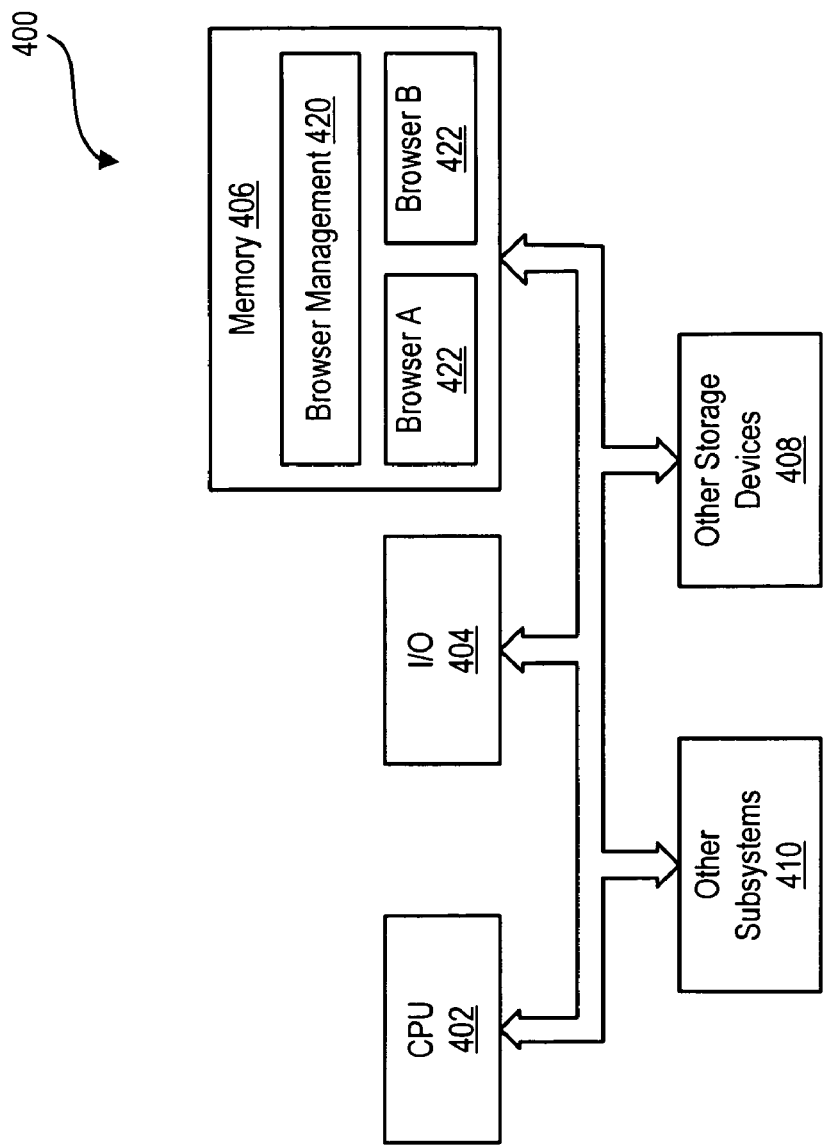
FIG. 4 shows a schematic block diagram of an information handling system.

Referring to FIG. 4, a system block diagram of an information handling system 400 such as target information handling system 120 is shown. The information handling system 400 includes a processor 402, input/output (I/O) devices 404, such as a display, a keyboard, a mouse, and associated controllers, memory 206 including non-volatile memory such as a hard disk drive and volatile memory such as random access memory, and other storage devices 408, such as a floppy disk and drive and other memory devices, and various other subsystems 410, all interconnected via one or more buses, shown collectively as bus 412. The memory 206 includes a browser management utility 420 as well as one or more browser applications 422 (e.g., browser A and browser B).

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 5A:
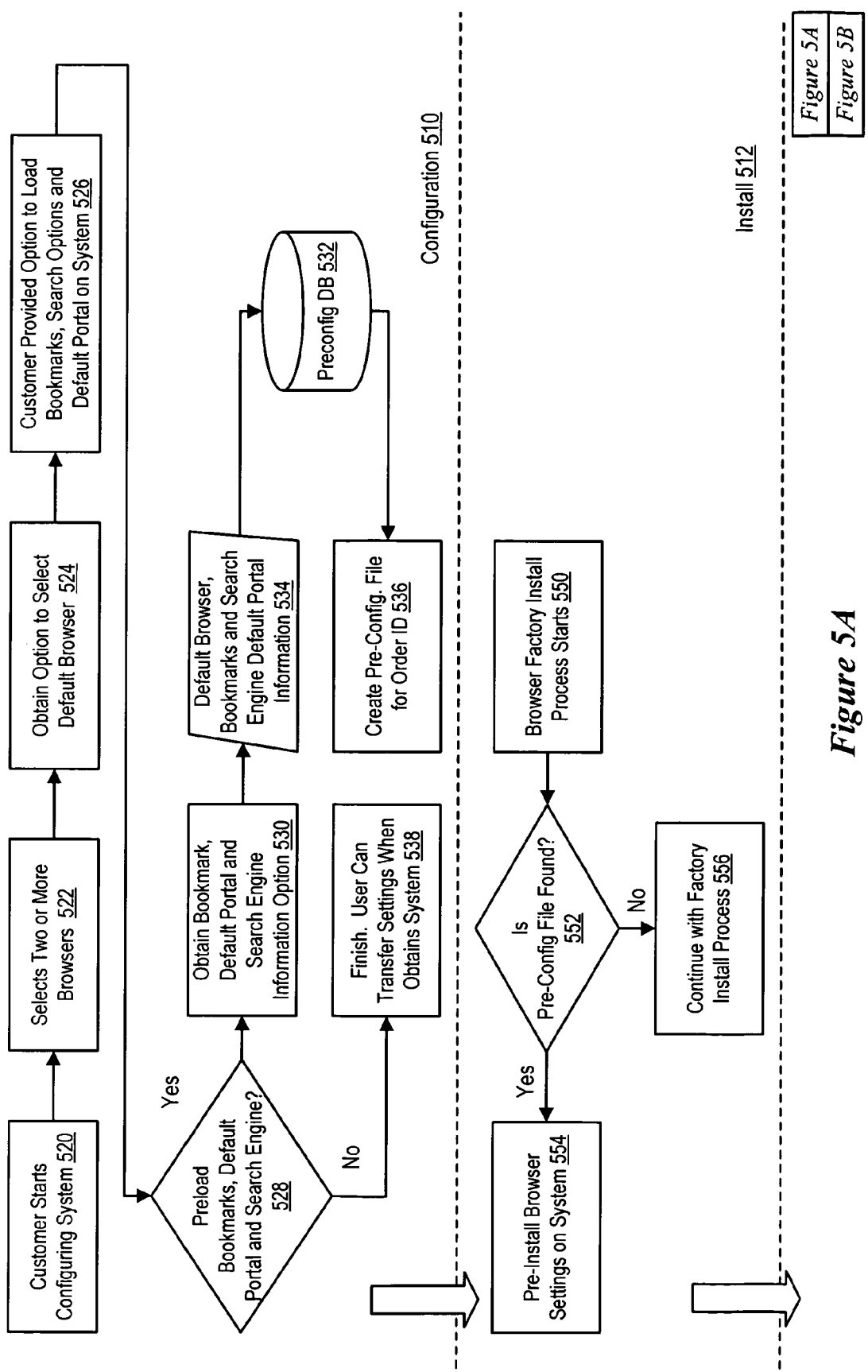
FIG. 5 shows a flow chart of the operation of a browser management utility.
Figure 5B:
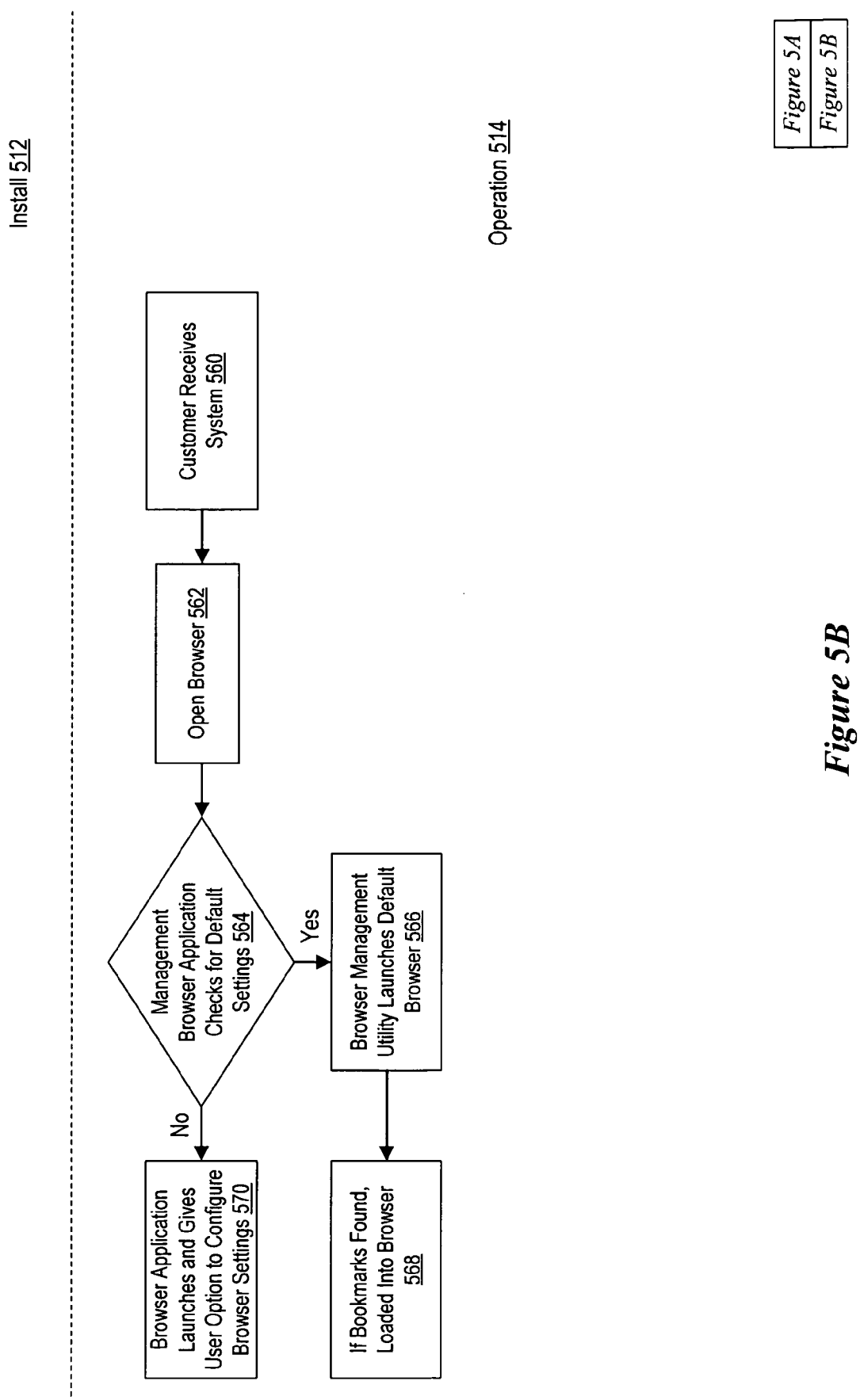

Referring to FIG. 5, a flow chart of the installation and operation of a browser management system 500 is shown. More specifically, the browser management system 500 includes a configuration portion 510, an install portion 512 and an operation portion 514. The operation of the configuration portion 510 may be provided via the browser selection module 219, operation of the install portion may be provided via the install process 300 and operation of the operation portion may be provided via the browser management utility 420.

During operation of the configuration portion 510 of the browser management system 500 a customer starts configuring an information handling system via e.g., the on-line store 210, as step 520. During this configuration, the customer may select a plurality of browsers to be installed onto the information handling system at step 522. The customer is then provided with the option of selecting a default browser at step 524. In one embodiment, the default browser may correspond to a browser that is executing on a present customer system. Next, the customer is provided with an option to load information from the present browser onto the browser of the newly ordered information handling system at step 526. This information can include bookmarks, search option, and default portal information.

If the customer indicates a desire to preload this browser information as determined at step 528, then the configuration process obtains this browser information at step 530. The browser information may be obtained by the customer manually providing this information or by reading the information from the browser of the customer's present system. Next this browser information is provided to a browser pre-configuration database 532 at step 534. The browser pre-configuration database 532 may be included within or linked to the database 224. Next, a browser pre-configuration file is created that corresponds to the order identifier for the information handling system at step 536.

If the customer declines the option of preloading the browser information at step 528, then the browser portion of the configuration process (e.g., via the browser selection module 219) completes at step 538. The user is presented with information to the effect that the user can transfer the browser settings when obtaining the system.

During operation of the install portion 512, the browser portion of the install process begins at step 550. Next, the install portion continues by determining whether a pre-configuration file is present for the target information handling system at step 552. If the pre-configuration file is present, then the install process continues by pre-installing the browser settings onto the target information handling system at step 554. If the pre-configuration file is not present, then the install process continues with the remainder of the factory install process without installing any user defined browser setting at step 556.

During the operation of the operation portion 514, the customer receives the information handling system at step 560. When the customer first actuates a browser at step 562, the browser management application is activated and checks for whether any default settings were installed onto the information handling system at step 564. If default setting were installed, then the browser management utility launches the so indicated default browser at step 566. If additional browser information was also installed, then the browser management utility loads this additional browser information into the so indicated default browser at step 568. If the browser management utility does not detect any preinstalled browser information, then the browser application actuated by the user launches and provides the user with an option of configuring the browser settings at step 570.

Figure 6:
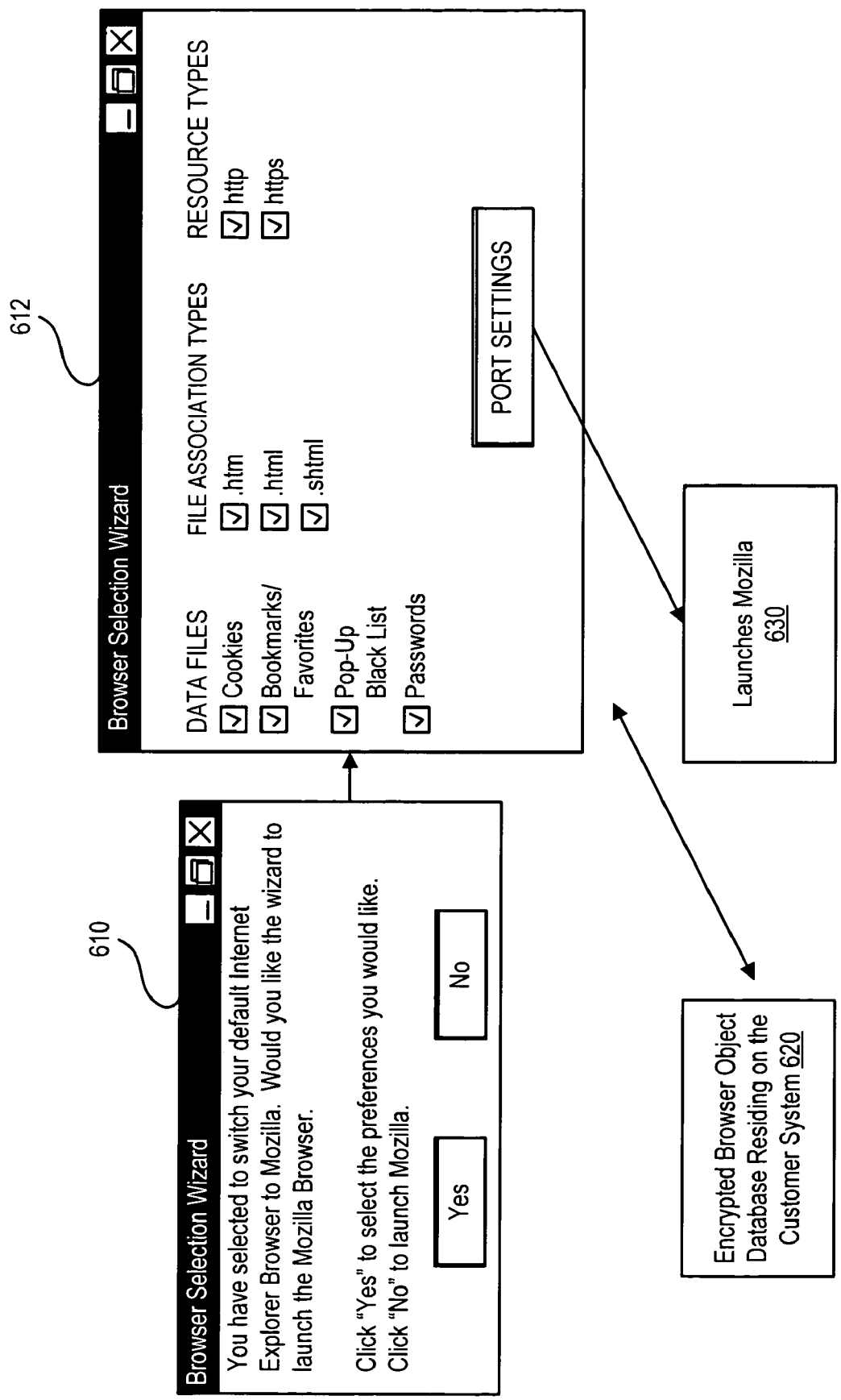
FIG. 6 shows an example presentation of a browser management utility.

FIG. 6 shows example presentations of the browser management utility 420. More specifically, one operation of the browser management utility is providing a user with a browser selection option. For example a user may be provided with an option of switching a default browser from an Internet Explorer browser to a Mozilla browser via a browser selection screen presentation 610. Next, the user may be provided with an option of selecting the types of browser information to port from a present browser application to the newly selected browser application via a browser information selection screen presentation 612.

If this information was preinstalled onto the information handling system then this browser information may be obtained from an encrypted browser object database 620. When the user indicates the desire to port the browser settings, by e.g., actuating the "Port Settings" button of the browser information selection screen presentation 612, then the browser management utility 420 launches the newly selected default browser (e.g., the Mozilla browser) at step 630.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while certain browser applications are mentioned, it will be appreciated that other browser applications are within the scope of the invention. Also, while certain types of browser information are mentioned, it will be appreciated that other types of browser information are within the scope of the invention.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for enabling configuration of an information handling system comprising:
   a configurator executing on a processor of a supplier information handling system, the configurator configuring a system with options selected according to user input, the configurator including
      a browser selection module executing on the processor of the supplier information handling system, the browser selection module enabling a user to select a default browser to be installed onto the information handling system during fabrication of the information handling system;
   a checkout module executing on the processor of the supplier information handling system, the checkout module presenting payment options and obtaining payment and delivery information;
   a database, the database receiving information from and supplying information to the configurator and the checkout module, and wherein the browser selection module provides the user with an option of porting browser information onto the information handling system;

the browser information is stored on the database if the user indicates a desire for porting the browser information onto the information handling system; and the browser information includes browser data files, browser file association types and browser resource types;

wherein the browser information is installed onto the information handling system during the fabrication of the information handling system.

2. The system of claim 1 wherein:

the default browser is installed onto the information handling system during the fabrication of the information handling system.

* * * * *